March 2, 1954  P. R. McEACHRAN  2,670,516
BLOCK-FORMING MACHINE
Filed March 12, 1948  8 Sheets-Sheet 2

INVENTOR.
PAUL R. McEACHRAN,
BY
Knight + Rodgers
ATTORNEYS.

March 2, 1954 P. R. McEACHRAN 2,670,516
BLOCK-FORMING MACHINE
Filed March 12, 1948 8 Sheets-Sheet 4

Fig. 4.

INVENTOR.
PAUL R. McEACHRAN,
BY
Knight & Rodgers
ATTORNEYS.

March 2, 1954

P. R. McEACHRAN

2,670,516

BLOCK-FORMING MACHINE

Filed March 12, 1948

INVENTOR.
PAUL R. McEACHRAN,
BY
Knight + Rodgers
ATTORNEYS.

March 2, 1954  P. R. McEACHRAN  2,670,516
BLOCK-FORMING MACHINE
Filed March 12, 1948  8 Sheets-Sheet 6

INVENTOR.
PAUL R. McEACHRAN,
BY
Knight & Rodgers
ATTORNEYS.

March 2, 1954 P. R. McEACHRAN 2,670,516
BLOCK-FORMING MACHINE
Filed March 12, 1948 8 Sheets-Sheet 7

INVENTOR.
PAUL R. McEACHRAN,
BY
Knight + Rodgers
ATTORNEYS.

Patented Mar. 2, 1954

2,670,516

UNITED STATES PATENT OFFICE 2,670,516

BLOCK-FORMING MACHINE

Paul R. McEachran, Los Angeles, Calif., assignor of fifty per cent to Harold R. Pauley, Los Angeles, Calif.

Application March 12, 1948, Serial No. 14,562

6 Claims. (Cl. 25—102)

The present invention relates generally to block-forming machines, and more particularly to machines for making construction blocks or bricks out of adobe, concrete, or other relatively dry plastic mixes, at a relatively high rate of production.

Various types of machines have been designed and made for making concrete brick or the like by a series of automatically timed mechanical operations so that a relatively high production rate is obtained from a single machine. However, known types of machines of this character have suffered from various defects of design which reduce their initial efficiency after a relatively short period of operation.

For example, machines of this character normally employ a plurality of molds which are passed in succession through a filling position at which the molds rest for a sufficient length of time to receive a charge of plastic mix. Exact positioning of the mold is essential at this stage in order to receive properly the charge and to form a perfect block. Yet in some types of machines there are such a large number of wearing surfaces, and these surfaces wear relatively rapidly because they are exposed to highly abrasive materials, that a small amount of wear on each of these surfaces is accumulative and soon destroys the accuracy of positioning the molds, not only at the filling position but at all other positions as well.

The same difficulty of rapid wear of parts applies in general to almost all of the bearings, cams, and other relatively moving or wearing parts of the machine of this type, since the cement, sand, and other abrasive particles inevitably get onto these moving surfaces. It is impractical to completely shield the moving parts to prevent such entry of abrasive particles. The result is an unusually high rate of wear which makes for unsatisfactory operation, costly maintenance, and undesirably frequent replacement of worn parts.

In view of this situation, it is a general object of my invention to provide a block-making machine of the character described having a plurality of molds in which blocks are formed, and in which the molds are positively registered in their rest positions in such a way that the registration is not affected by wear of moving parts.

It is also a general object of my invention to provide a machine of this character in which the wear of all moving parts, although reduced to a minimum by reducing to a minimum the number of parts, does not affect the accuracy or performance of the machine except when wear has become very considerable. Differently stated, it is an object to provide a machine which operates satisfactorily even though initially close tolerances have increased greatly and bearings have become loose.

It is another object of the invention to provide a block-making machine providing for a positive forced feed of the plastic mix into the molds in order that the mix may be kept as dry as possible while at the same time obtaining a block which is of high density and perfect shape by virtue of having completely filled the mold.

It is of course another object of my invention to produce a block-making machine having the above characteristics which also has a relatively high production rate so that a minimum investment and operating cost is involved in producing blocks at a given daily rate.

These and other advantages of my invention are attained by providing a table having a plurality of mold cavities which, by reciprocating the table, are alternately moved under a reservoir from which a charge of plastic mix is received, and then into a stripping position in which the formed block is removed from the mold. Means for reciprocating the sliding table includes a continuously rotating bull wheel and a pair of tension members, such as steel cables and rods, which are attached one to each of the two opposite ends of the table and are engaged alternately by the rotating bull wheel. Thus on one revolution of the wheel, the table is moved in one direction, while during the next rotation it is moved equally in the opposite direction.

At each of the two rest positions of the table, one mold is directly under a reservoir or hopper containing a quantity of mix which is fed into the mold by intermittently rotating paddles and a reciprocating ram which compacts or tamps the charge within the mold. This ram is driven by the same common shaft driving the bull wheel and consequently is operating in timed relation with the movement of the table so that it makes a compacting stroke when the mold is stationary beneath the ram.

While the one mold is stationary and being filled, another mold in the table is also stationary, but is near the other extreme of the table travel and occupies its block-removing position where intermittently operated stripping means lifts the formed block upwardly out of the mold cavity into a frame where it is received and held by a number of resilient members. The stripping means then retract downwardly through the mold, leaving the block above it. This downward motion of the stripping means is also preferably utilized to carry into the mold cavity a replacement pallet which prepares the cavity to receive a new charge of mix for forming another block. The mold-stripping means is also driven from the common drive shaft so that it operates in synchronism with the movement of the table.

Since two molds operating as a pair are interconnected by the table, the distance between them remains constant. When the table is properly positioned to correctly locate one mold, the position of the other mold is determined. Thus a table-registering mechanism is used at each end of the table consisting of a latch member engageable with a fixed member carried by the frame. The latch is adapted to hold the table firmly against movement in one direction, while the table is normally urged to move in that direction by a spring or other resilient means, which in this particular embodiment of my invention is incorporated in the linkage connecting the table to its drive means. One reason for incorporating this elastic member into the drive linkage is to smooth out the operation of the table and to help accomplish the work involved in initially moving the table after a mold has been filled, because during this initial movement excess mix is sheared off the top of the mold to size the block on that face.

How the above objects and advantages of my invention are attained, as well as other objects and advantages not specifically mentioned herein, will be better understood by reference to the following specification and to the annexed drawings, in which:

Referring now to the drawings and considering the machine in its general aspect, it will be seen that the machine comprises a reservoir, generally indicated at H, which holds in two separate hoppers a supply of the mix from which the bricks or blocks are formed, the mix being fed out of the two hoppers of reservoir H into the molds. The mix is packed into the molds by a vertically reciprocating ram indicated generally at R, and the molds consist of cavities in the horizontally reciprocating table indicated generally at T beneath the ram. At either end of the frame is a plurality of pins forming a stripping means, indicated generally by S, adapted to move upwardly to strip a block out of the molds, and then to retract downwardly, while the table is in one extreme position or the other. All of these several elements are driven in synchronism or timed relation by the centrally located driving mechanism indicated generally at D which comprises a common drive shaft to which are fixed cams, cranks, and other rotating elements that impart motion to the various sub-assemblies of the machine through the agency of suitable types of drive linkage. F is used to refer to the frame of the machine carrying these various assemblies.

Construction

Figures 2, 8:
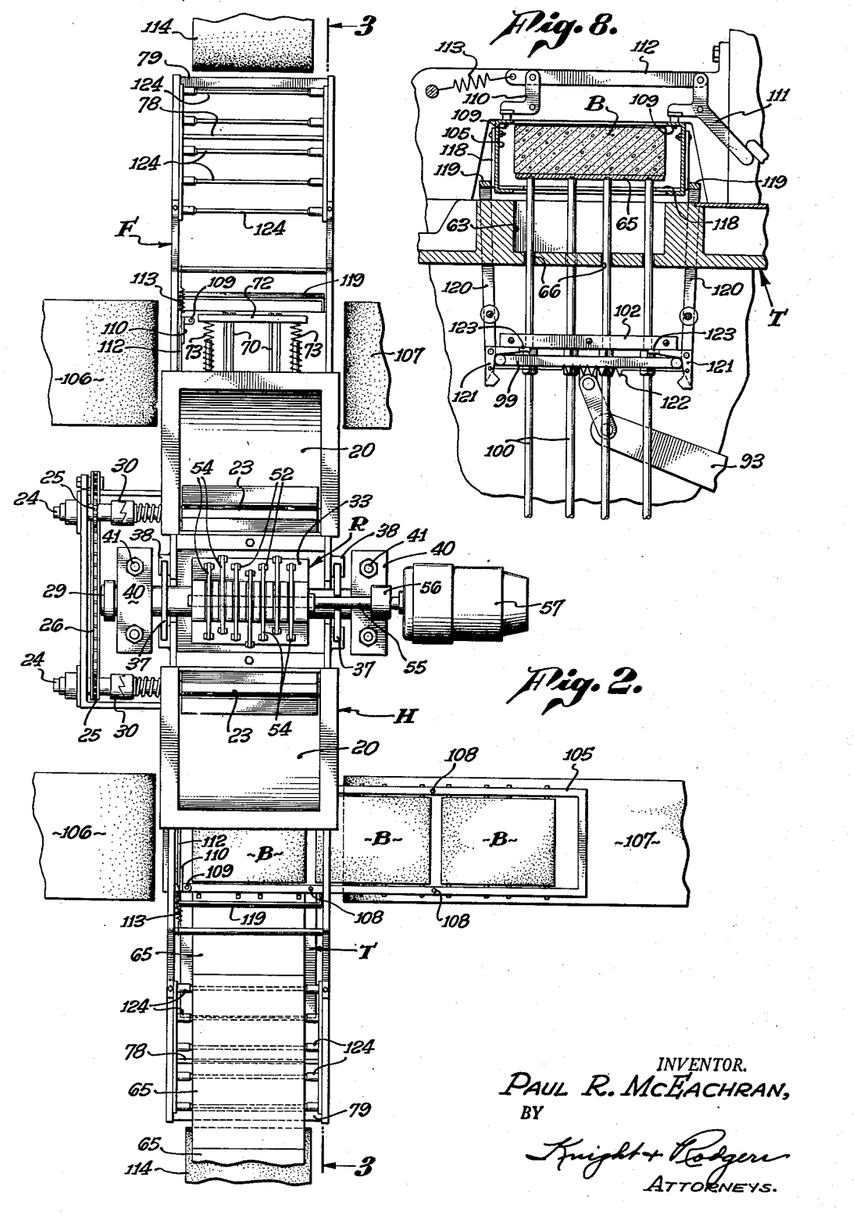
Fig. 2 is a plan view of the block-forming machine, blocks and pallets therefor being shown at the left-hand end of the machine.
Fig. 8 is a fragmentary vertical section similar to a part of Fig. 6 showing the stripping pins at the top of their upward movement carrying thereon a formed block and pallet.
Figure 3:
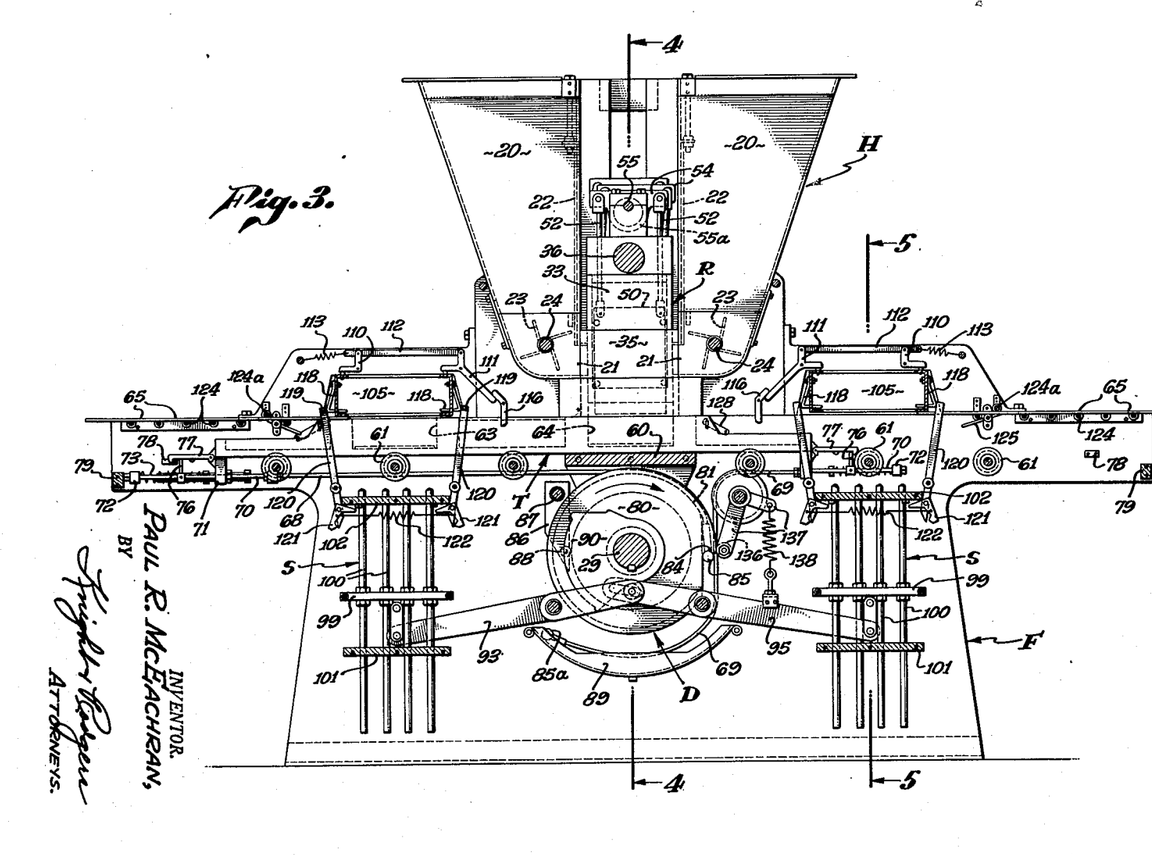
Fig. 3 is a longitudinal vertical section on line 3—3 of Fig. 2, taken just inside the side plate of the frame.
Figures 6, 7:
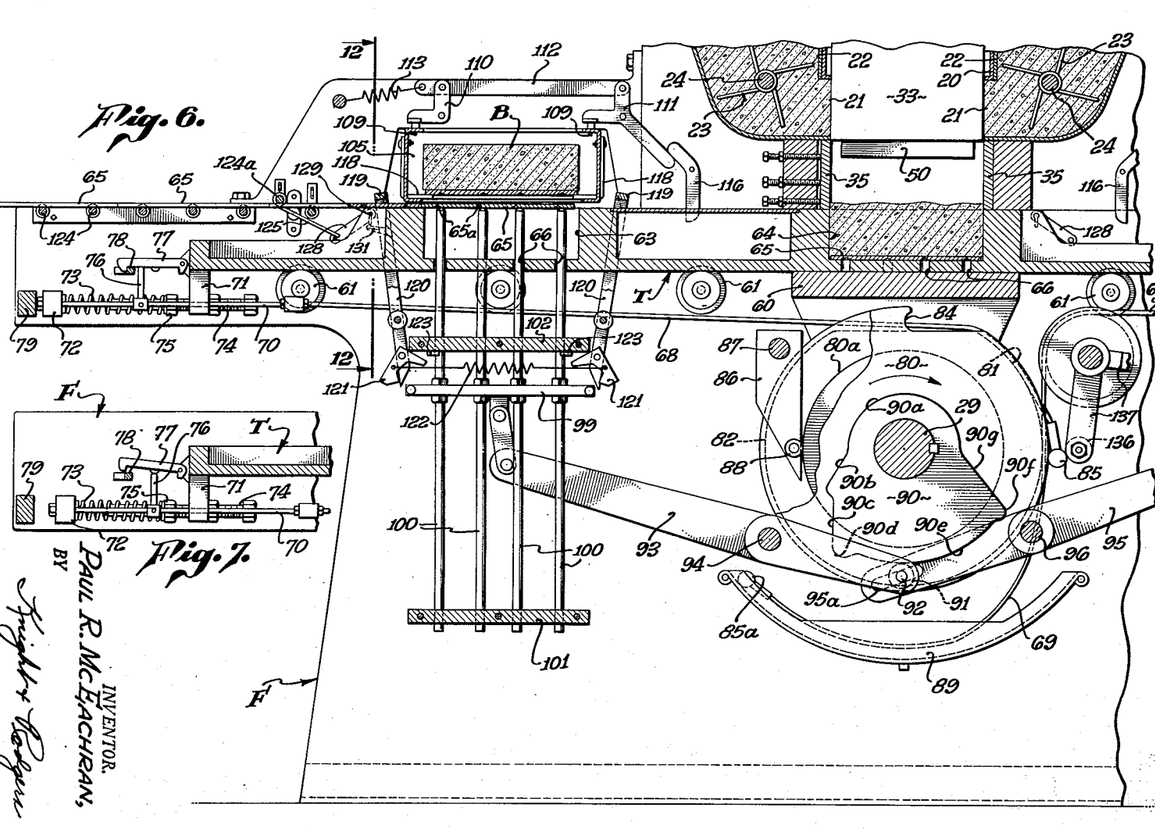
Fig. 6 is a fragmentary longitudinal vertical section on line 6—6 of Fig. 4, but to a slightly larger scale showing a formed block after it has just been stripped from a mold.
Fig. 7 is a fragmentary view similar to a part of Fig. 6 showing the table latch at the instant of release.

Considering the apparatus in detail, it will be seen that the reservoir H for holding a supply of plastic mix comprises two similar hoppers 20, each of which is open at its top side (Fig. 2) to receive the mix which is discharged at the bottom of the hoppers. It is, of course, possible to use but a single hopper; but it is preferred to use two as the mix can be more rapidly and uniformly fed into the path of the ram and into the mold with the construction here shown. Each hopper has a discharge opening 21 at the bottom of the vertical wall facing the other hopper, as shown in Fig. 3. The size of this opening can be regulated by vertically adjustable gate 22 (Figs. 3 and 6).

Figure 1:
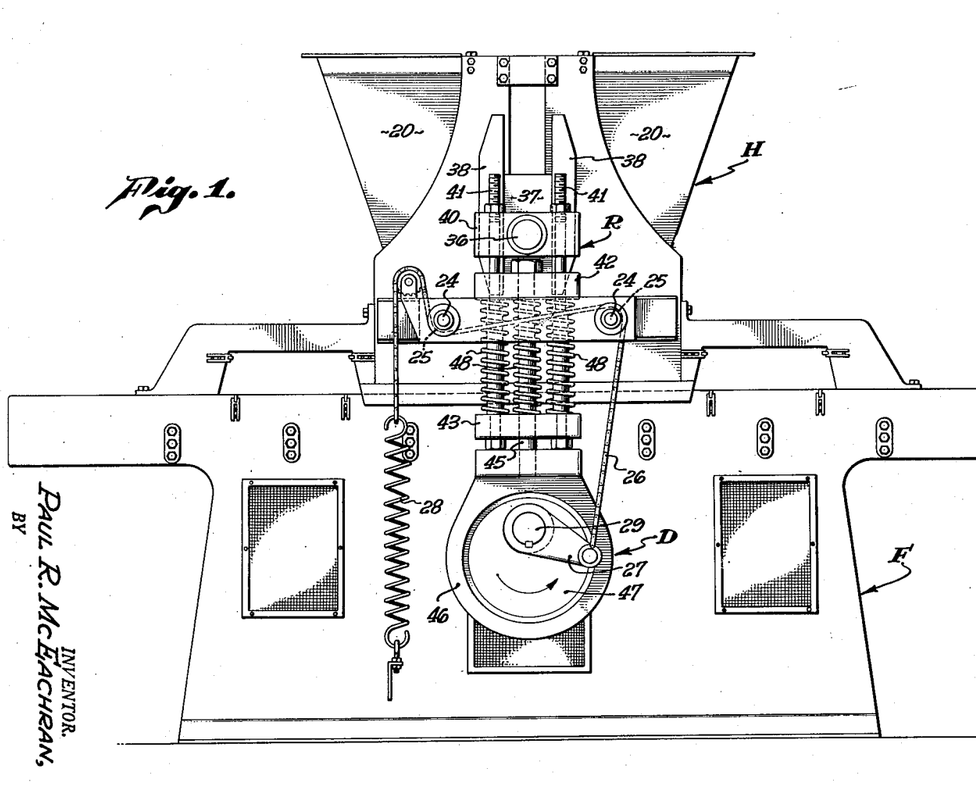
Fig. 1 is a side elevation of a block-forming machine constructed according to my invention.

As will be more apparent from the following description, it is desirable that the plastic mix be as dry and stiff as possible in order that the block will hold its shape when removed from the mold; and in this condition it is normally too stiff to flow freely out of the bottom of the hoppers. For this reason a positive feed means is provided at the bottom of each hopper consisting of a paddle 23 having several radial blades mounted upon a rotating shaft 24. Paddles 23 are intermittently rotated by chain 26 which, as shown in Fig. 1, passes alternately under and over sprockets 25 on the outer ends of shafts 24 in order that a pull on the chain rotates the shafts in opposite directions, the paddle wheels moving toward each other at their undersides in order to force material out of hopper openings 21.

One end of chain 26 is attached to continuously rotating crank 27 on shaft 29, while the other end, after leaving sprocket 25, passes over an idler and is attached to spring 28. In this way downward pull of crank 27 on chain 26 rotates shafts 24 as described, while upward movement of the crank allows spring 28 to retract the chain. Reverse rotation of paddles 23 is avoided by ratchet means 30 (see Fig. 2) on each shaft 24. In this manner, movement of chain 26 under the pull of spring 28 produces no motion of paddles 23 but sprockets 25 turn freely.

Figure 4:
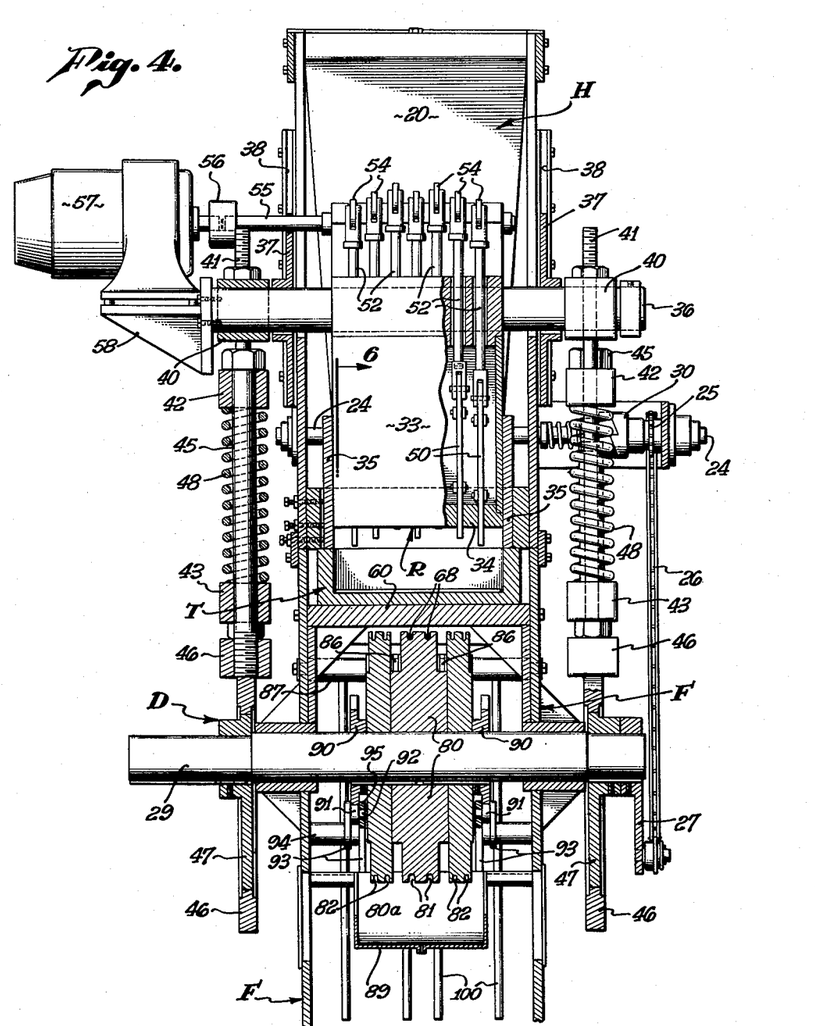
Fig. 4 is an enlarged vertical transverse median section on line 4—4 of Fig. 3, showing the ram and main drive shaft.
Figure 5:
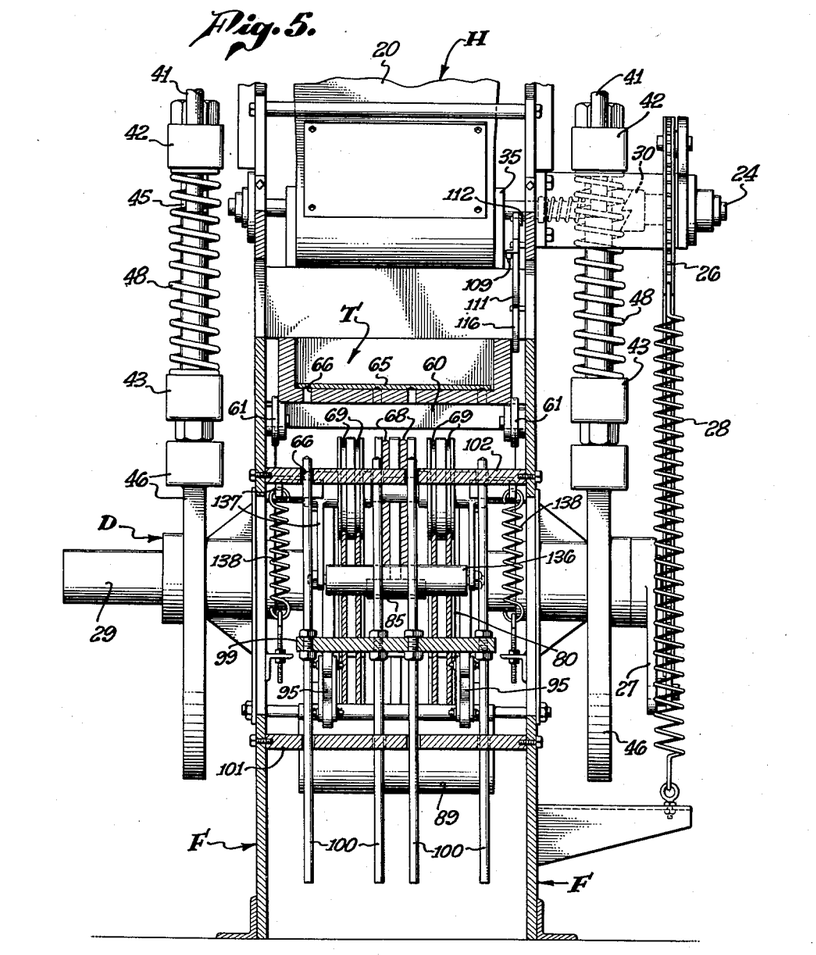
Fig. 5 is an enlarged vertical transverse section on line 5—5 of Fig. 3 through the block-stripping mechanism.

The vertically reciprocating structure R is mounted in the space between the two opposed vertical faces of hoppers 20. This ram structure comprises basically a traveling head 33 which presses the mix into the molds, and a tamping mechanism, described below. This construction is shown most clearly in Fig. 4. Ram 33 is hollow, and of rectangular cross-section congruent to the block mold; and it has at the bottom a face plate 34 which provides the forward or working face of the ram. The ram is guided in its vertical reciprocation by a rectangular guide 35 which has adjustable wall portions as shown in Figs. 4 and 6, to permit regulation of the clearance between the faces of guide 35 and ram 33. The walls around guide 35 are made heavy to withstand the high pressures of block compaction.

The ram is mounted upon transverse shaft 36 which is provided near each end with a shoe 37 that slides on and between vertically extending guides 38 mounted in pairs on the sides of frame F.

Transverse shaft 36 and ram assembly R are moved vertically by a drive linkage shown in Figs. 1 and 4. This linkage is the same at each side of the machine; and at each side comprises a collar 40 attached to shaft 36 near one end and carrying a pair of vertically extending rods 41 which pass through upper and lower crossheads 42 and 43, respectively. Rods 41 slide within crosshead 42 but do not move longitudinally with respect to lower crosshead 43, while the center rod 45 is movable longitudinally relative to both lower crosshead 43 and upper crosshead 42. Drive rod 45 is connected at its lower end to collar 46 which surrounds eccentric 47 on drive shaft 29 so that rotation of the eccentric causes rod 45 to be moved up and down.

Each of rods 41 and 45 carries a compression spring 48, the ends of which bear against crossheads 42 and 43. Power for driving the ram is transmitted through springs 48 which are compressed during the downward stroke of the ram, and expand during the upward stroke. Springs 48 thus provide an elastic connection between the ram and its source of power to absorb shock and store energy during the operation of the ram, as will be described in greater detail later.

Reciprocating ram structure R has mounted upon it, to move therewith, a tamping mechanism which consists of a plurality of plates 50 which reciprocate in slots in face plate 34. Plates 50 are of slightly less width than the ram, as viewed in Fig. 6, and are spaced at short intervals along the length of the ram, as shown in Fig. 4. The plates fit rather snugly within the openings in plate 34 in order to be guided thereby. Each plate 50 is reciprocated by a pair of push rods 52 (see Fig. 3) attached one at each end of a yoke 54 mounted upon an eccentric bearing on drive shaft 55. There is a separate bearing for each yoke, and the bearings are angularly spaced in succession along shaft 55, so that not all tampers 50 are in phase. Only the end eccentric bearing is indicated at 55a in Fig. 3. Shaft 55 is connected through coupling 56 to motor 57 mounted on one end of transverse shaft 36 by means of bracket 58. Motor 57 rotates shaft 55 to reciprocate rapidly the several tampers 50 while the motor, the shaft, and the tampers all travel up and down together with crossshaft 36 and ram 33. It will be understood that shaft 55 can be driven by appropriate mechanical linkage to main drive shaft 29; but the drive shown is preferred because of its simplicity.

In order to support reciprocating table T, stationary frame F is provided with a flat bed 60 directly beneath ram R. In horizontal alignment with bed 60 and at each side thereof, there is a plurality of roller 61, mounted on the frame, which also support table T. Rollers 61 are located at suitable intervals, there being here shown three rollers at each side of stationary bed 60. Sliding on bed 60 and rollers 61, table T can move between two extreme positions, one of which is shown in Figs. 3 and 6. Table T is provided with two mold cavities 63 and 64; and in the position shown in these figures, cavity 64 is directly beneath ram 33. In the other extreme position, mold cavity 63 is beneath the ram.

Mold cavities 63 and 64 are here shown as being rectangular in cross-section in order to make a single solid block B having six rectangular faces. This is the type of building block produced when it is desired to make one similar to adobe blocks. However, it is a simple matter to produce blocks or bricks of a different size and character by changing the shape and character of the mold cavities. For example, removable liners may be inserted in the mold cavities to reduce their size and the size of the block produced; and such a liner may include a median partition extending lengthwise in the direction of table movement so that each mold cavity is in effect divided into two separate molds and two blocks each of only half the size shown in the drawings are then produced at the same time. These liners also may have centrally located projections extending upwardly from the bottom, the purpose of which is to produce a hollow block of any one of several conventional styles. Thus, while I speak of the table as having two spaced molds or mold cavities, it will be understood that the table may have more than two molds if desired; and although it will ordinarily be the case that these molds will be arranged in spaced pairs, yet this is not necessarily strictly so since blocks of one size and character may be produced at one end of the table, while a different number of blocks of another size and character are produced at the other end of the table.

For reasons which will become clear from subsequent description, each of the mold cavities is lined at the bottom with a removable pallet 65, which, among other functions, serves to close openings 66 in the bottom wall of each mold.

Means for reciprocating table T includes a pair of tension members 68 and 69, each of which are attached to one of the two opposite ends of table T. Tension members 68 and 69 are each shown here as having a flexible section provided by a plurality of wire cables, but my invention is not limited to cables or to any specific member or type of cable and it is possible for each tension member to comprise but a single cable. The manner of connecting both members 68 and 69 to table T is the same, except that they are connected at opposite ends, so that the illustration and following description of the connection of the tension member 68, as shown in Figs. 6 and 7, is also a description of the connection of member 69.

Tension member 68 has rigid terminal section adjacent table T, as for example rods 70 which are attached one to each of the two cables of member 68 and slide in depending lugs 71 on the underside of table T. At their extreme outer ends, the two rods 70 are interconnected by bar 72 which bears against two compression springs 73 placed between crossbar 72 and the end of table 71. Each spring is held in place by a bolt 74 threaded into lug 71 so that the compression in the spring can be adjusted by changing the position of nut 75 on the bolt. In this construction, the pull upon cable 68 is transmitted to table T through springs 73 which not only act as shock-absorbing and energy-storing means in the linkage for reciprocating the table, but also permit limited relative movement of the table reciprocating elements relative to the table. In order to utilize this relative movement, one of rods 70 is provided with a rigid upwardly extending finger 76 which, when moved toward the end of table T as shown in Fig. 7, engages a projection on the underside of pivoted latch 77 to disengage the outer end of latch from stop 78 fastened to the machine frame F. Latch 77 is pivotally connected at the other end to table T. When latch 77 engages stop 78 as shown in Fig. 6, the table is held against movement toward the right, but when the latch is disengaged as shown in Fig. 7, the table is free to move in that direction.

Frame F is also provided with a transversely extending bumper bar 79 against which the ends of rods 70, or alternatively crossbar 72, hit to limit the travel of table T toward the left. At the end of table movement in this direction, springs 73 are compressed to some extent, allowing the table to move toward the left beyond the position shown in Fig. 6, and thus allowing latch 77 to drop into position over stop 78. Engagement of the latch with the stop holds the table in the position shown upon its reverse movement under the expansion of springs 73.

As part of the drive means for reciprocating table T, there is provided on drive shaft 29 bull wheel 80 which rotates continuously. For convenience, bull wheel 80 is made in three major sections (see Fig. 4); and it has peripheral grooves for each of the cables in tension members 68 and 69, there being two such grooves 81 in the construction shown in Fig. 4 to receive the two cables 68. The wheel also has a similar peripheral groove 82 for each of the four cables 69.

The bull wheel is also provided with a peripheral notch 84 by which the wheel engages the free ends of members 68 and 69. For this purpose, the free end of each of these flexible members is provided with a coupling member 85 or 85a, respectively, of suitable configuration to engage and remain in notch 84; and I find that a short horizontal bar 85 (or 85a) attached to the end of a set of cables is suitable. One advantage gained from having a plurality of elements in each set of linkages 68 and 69 is that a bar is more easily held in the proper position to be engaged by notch 84 than if it were attached to but a single cable. Fig. 3 shows coupling 85 seated in notch 84 to effect a driving connection between the rotating bull wheel and cable 68. The pull now imparted to the cables by the bull wheel moves table T to the right; and this motion of the table continues until coupling 85 engages the inclined face of ejector 86 which pulls the coupling out of notch 84 and disengages the cables from the bull wheel to limit the travel of the table.

Ejector 86 may take any particular form desired, but is here shown as being a pair of flat bars mounted on transversely extending rod 87 attached at its ends to frame F. Each ejector bar rides in a deep annular groove in bull wheel 80. As is shown in Fig. 4, the bull wheel is preferably made in three sections. The central section is formed at each side with a hub or shoulder 80a which, with the end sections of the bull wheel, define the annular spaces in which each bar of ejector 86 rides. A roller 88 on the lower end of each ejector bar of 86 rides against the annular shoulder 80a on the central section of the bull wheel (see Fig. 6) to provide the necessary support for the lower end of the ejector when it engages crossbar 85 to force it out of notch 84.

In order to operate the stripping means S for removing a block from molds 63 and 64 in timed relation with the other operating elements of the machine, drive shaft 29 is provided with cam 90 which rotates continuously with the drive shaft. I speak of cam 90 hereinafter as being a single element, although, as shown in Fig. 4, there are actually two cams 90. Since a single cam cannot be conveniently located at the center of the machine, I prefer to split it into two halves located symmetrically about the vertical center plane of the machine in order to obtain better balance of the operating structure; and there is associated with each of these halves a similar cam follower and operating lever assembly such as shown in elevation in Figs. 3 and 6.

Both cams and their followers operate as a unit, and may be so considered for purposes of this explanation. Roller cam follower 91, which engages the external peripheral face of cam 90, is rotatably mounted on a pin 92 on the end of operating lever 93 which in turn is pivotally mounted on frame F at 94. Pin 92 projects beyond follower 91 and passes through a slot 95a in the end of second operating lever 95 which is pivotally mounted on frame F at 96. Thus the inner ends of operating levers 93 and 95 are spaced apart and have cam follower 91 between them. Lever 95 is here shown as being a straight member; and lever 93 is off-set inwardly at its fulcrum in order that its outer end is in the same vertical plane as a lever 95. As shown in Fig. 3, levers 93 and 95 are disposed symmetrically about the vertical transverse plane containing the axis of shaft 29, and will be moved at the same time and in approximately the same amounts by cam 90, except for the slight difference caused by the fact that follower 91 is fixed on lever 93 with respect to fulcrum 94, but is able to move within the slotted end of lever 95 so that follower 91 shifts slightly with respect to fulcrum 96.

The outer end of each lever 93 and 95 is attached, by means of a short pivoted link, to the underside of a horizontal plate 99 which has attached to it a plurality of vertically extending rods or pins 100. Pins 100 are slidably mounted for vertical reciprocation in guide plates 101 and 102 fastened to frame F at positions below and above, respectively, plate 99. As shown in Fig. 3, this construction at each end of the machine is similar.

When the rotation of cam 90 depresses follower 91 and the inner ends of operating levers 93 and 95, the block stripping means comprising plate 99 and pins 100 is raised as shown in Fig. 6. The pins pass through openings 66 in the bottom of each mold cavity and engage the removable pallet 65 in the bottom of the mold. The pins lift the pallet and the block thereon clear of the table, and are then retracted downwardly as further rotation of cam 90 allows follower 91 and the inner ends of arms 93 and 95 to rise, thus lowering the stripping pins.

The number of pins 100 that may be used varies somewhat. I prefer to use at least four pins for each mold cavity 63 and 64, and there is here shown a construction in which there are twelve pins per cavity. This number is shown because each cavity is sufficiently large that it can be subdivided by suitable liners, as described above, into two smaller cavities. The pins are so distributed here that each of the smaller blocks formed in this manner has six pins operating to strip it from the mold; and this number of pins is used in order to get satisfactory distribution of the stripping pressure over the pallet under the block and keep the block from tilting after it is lifted clear of the mold.

Whatever the number of pins used, at least the same number of indentations 65a is provided in the bottom of each pallet 65 and at least the same number of openings 66 in the bottom of each mold. Likewise openings 66 and indentations 65a are in the same pattern as the pins in order to secure registration of all these elements. Indentations 65a are conical in shape and cooperate with the conical upper ends of the stripping pins as will be described.

As shown in Fig. 6, one set of stripping pins 100 is so positioned as to remove a block from mold 63 when it has reached the extreme left-hand position of travel. The other set of stripping pins is so positioned as to enter and remove a block from mold 64 when it has been moved to the right and come to rest at the stripping position. Since mold 63 and 64 move alternately toward and away from a charge-receiving position directly under ram 33, which is the position of mold 64 in Fig. 6, the spacing of the stripping means is twice the spacing between these two molds 63 and 64.

In order to receive the blocks after they have been stripped from the molds and to remove them from the machine, any suitable type of block discharge mechanism may be provided. However, I prefer to provide for this purpose a plurality of curing frames which are adapted to receive and hold one or more blocks and to be transported with the blocks to a place at which the blocks are aged or cured, as by air drying or other process. One frame of this character is illustrated at 105 which, as may be seen best at Fig. 2, is large enough to receive three blocks B. Frames 105 are fed into the machine by means of a continuously moving belt 106 which brings the empty frames into position, and the belt 107 removes the filled frames.

Each successive loading position of each curing frame is determined by registration pins 109 which pass downwardly into registration holes 108 in the upper edges of frame 105 to properly position the frame with respect to mold 63 and the stripping means.

Pins 109 are mounted on the arms of bell cranks 110 and 111 which are interconected by bar 112 (Figs. 6 and 8). Spring 113 is connected to one end of bar 112 and to frame F and normally urges bell cranks 110 and 111 toward rotation in a counterclockwise direction, as viewed in Fig. 6, to force pins 109 downwardly. Thus pins 109 ride along the top of the side of curing frame 105 until registration holes 108 are reached. Then the pins drop into the registration holes, stopping the curing frame and holding it against further advancement. If the frame is of a size to receive but a single block B, only one set of registration holes is provided; but the frame shown in Fig. 2 is large enough to hold three blocks, so it provided with three sets of registration holes 108.

Figure 11:
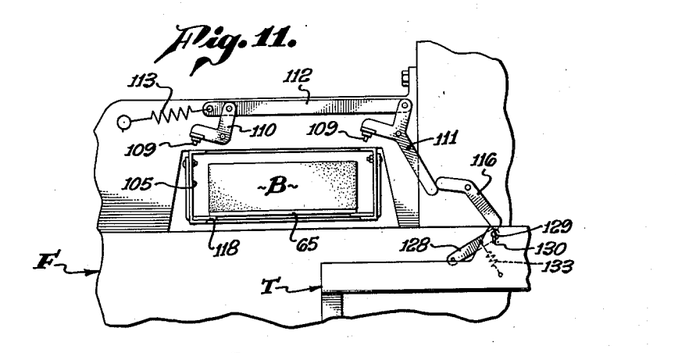
Fig. 11 is a fragmentary vertical section similar to a part of Fig. 6, showing the released position of the indexing device for indexing the frame that receives blocks from the stripping means.

In order to release frame 105, means are provided for raising registration pins 109. This means includes an extension on bell crank 111 which is engaged by lever 116, the lower end of which is engaged by table T. As table T moves to the right in Fig. 6, lever 116 is rotated in a counterclockwise direction, depressing the outer end of the long leg of bell crank 111 which is thus rotated, along with bell crank 110, in a clockwise direction to lift pins 109 out of the registration holes 108 in frame 105. Lever 116 is preferably actuated by a pin on table T, so that its pressure on bell crank 112 is only briefly applied and pins 109 are again free to be moved downwardly under the normal biasing action of spring 113 before another set of registration holes 108 has moved into position opposite the pins. This pin on table T may conveniently be an extension of shaft 129, as shown in Fig. 11.

Each frame 105 is provided along its longer side with a plurality of spring fingers 118 which hold a brick within the frame. Spring fingers 118 are in the form of angular leaf springs (see Fig. 3) with the two legs extending at nearly right angles to each other. They are fastened at their upper ends to the sides of frame 105 and normally assume the position of Fig. 3 in which the fingers do not extend within the perimeter of the clear opening in the bottom of the frame. However, after block B has been lifted into the frame, the fingers are pressed inwardly at their lower ends as shown in Fig. 8 so that when the block is lowered it rests on the free ends of fingers 118, as shown in Fig. 6. The weight of the block on the fingers presses them against the frame 105; and the frictional engagement prevents their withdrawal from under the block by the force of the normal resiliency of the fingers. Alternatively, any suitable positive catch may be used to hold the fingers in their inner position by engaging frame 105.

Figure 12:
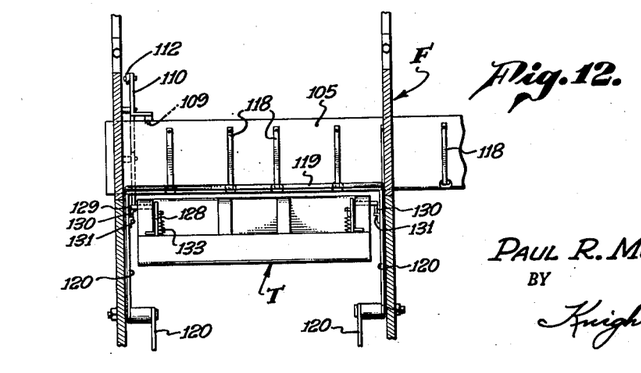
Fig. 12 is a fragmentary transverse section on line 12—12 of Fig. 6 showing substantially only an end view (looking from the left) of the mechanism shown in Fig. 11.

In order to move the lower ends of fingers 118 inwardly into the block-engaging position, there is provided mechanism including levers 120 pivotally mounted on frame F as in Fig. 12, and connected by crossbars 119 that engage the spring fingers at each side of the frame. As plate 99 moves upwardly, it engages the lower ends of arms 120 at each side of the plate and forces them outwardly, thus moving the upper ends of arms 120 and crossbars 119 inwardly into engagement with spring fingers 118, bringing them to the position of Fig. 8.

It is desirable to retain the spring fingers 118 in their inward positions for a short length of time during the initial portion of the downward travel of the stripping means; and for this purpose there is provided a latch arrangement on the lower ends of arms 120. This mechanism includes two irregularly shaped latch plates 121, each pivotally mounted near the lower end of one of two opposite arms 120, and interconnected by means of tension spring 122. As arms 120 are spread apart at their lower ends by plate 99, spring 122 pulls latch plates 121 around until their upper fingers rest against the sides of stops 123, as seen in Fig. 8, in which position the latch plates hold arms 120 in engagement with spring fingers 118. During the initial downward movement of the stripping means, this relation of the parts is maintained until after the upper ends of pins 100 have cleared frame 105. At this point in their movement, plate 99 strikes the inward projections on the lower ends of latch plates 121 and causes them to disengage stops 123. Spring 122 now draws the lower ends of arms 120 together and disengages crossbars 119 on the upper ends of these arms from spring fingers 118, which remain in the inward position of Fig. 6 since they have been previously loaded by the weight of block B resting thereon.

When the stripping means removes a block from the mold, it carries with it the removable pallet upon which the block is formed, as shown in Fig. 8. Thus, after each mold is stripped, it becomes necessary to replace the pallet with a new one, and for this purpose I provide means for advancing a row of pallets toward the mold. The row of advancing pallets 65 for mold 63 as shown in Fig. 6, while a similar row, not shown, is located at the other end of the machine for supply to mold 64.

The pallets are preferably fed continuously into the machine by some such means as continuously moving belt 114 which delivers the pallets onto supporting rollers 124. A similar row of rollers 124 is provided at each end of the machine, mounted on frame F. The rolls 124 in each row are horizontally aligned except for roll 124a which precedes the last roll 124 and is above the row by about the thickness of a pallet. Since the innermost pallet is finally supported only by the last roller 124, as may be seen in Fig. 6, the pallet would, if unrestrained, become unbalanced, and fall forward; but roll 124a, being above the pallet, prevents this tipping until the leading edge of the pallet can be advanced over and rested upon the near edge of the mold after clearing roller 124a.

Since the mold is intermittently in a position to receive a replacement pallet, it is necessary to provide feed regulating means, so that the actual supply to the mold is intermittent, although the supply to the machine as a whole may be continuous. For this reason, the row of pallets 65 on rollers 124 is actually advanced intermittently, although the pressure of each succeeding pallet on the one ahead of it is continuous and tends to advance the pallets at all times.

Figure 9:
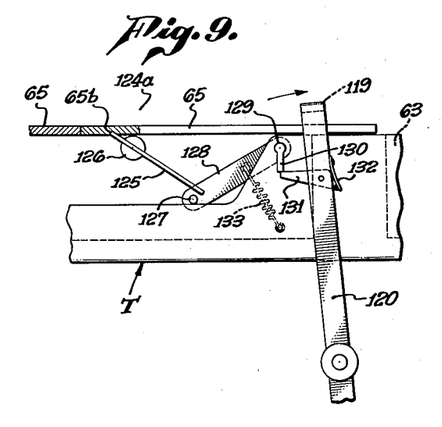
Figs. 9 and 10 are fragmentary vertical sections similar to parts of Fig. 6 showing the pallet feed control means in different positions.
Figure 10:
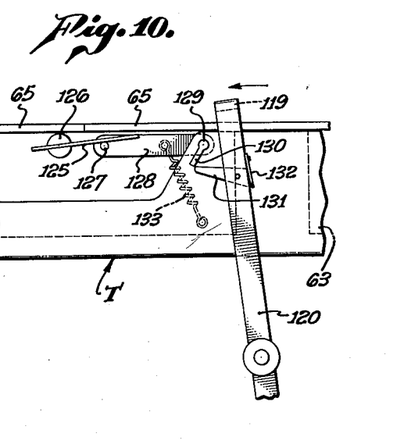

This feed regulating means is shown best in Figs. 9 and 10 and includes a gravity-biased stop 125 pivotally mounted on frame F at 126. One end of stop 125 projects farther beyond pivot 126 than the other, so that the longer end naturally tends to drop downwardly, thus bringing the shorter end continuously into scraping contact with the underside of the advancing pallets 65. Each pallet has a notch on its underside near one end which is the rear end referred to the direction of pallet movement. The notch has a forwardly facing shoulder 65b which engages the upper end of stop 125 when the pallet is close to but slightly short of reaching the near edge of mold 63, as shown in Fig. 9. Stop 125 is located to bring its notch-engaging end directly under roller 124a so that the end of the pallet is held down against the pressure of stop arm 125 and is firmly seated in the notch in the pallet and against shoulder 65b. In order to advance the lead pallet, stop 125 is rotated counterclockwise to the position of Fig. 10 by pin 127 on arm 128 which is pivotally mounted at 129 on the side of table T. Pivot shaft 129 also carries a second short arm 130 in a position to be engaged by extension 131 on arm 120. Arm 120 carries a short leaf spring 132 which bears against one flat end of extension 131 to hold it normally in the position shown in Fig. 10. In this position extension 131 can engage the side of arm 130 when arm 120 moves to the left or counterclockwise as viewed in Fig. 10. This motion imparted to arm 130 causes arm 128 to rotate in a clockwise direction, bringing pin 127 upwardly into engagement with the underside of stop 125 which is then rotated out of engagement with pallet 65.

Motion of the upper end of arm 120 toward the left occurs as it moves away from a curing frame 105 to its original or rest position so that pallet 65 is released for forward movement after a block B and a pallet have been removed from the mold and placed in the curing frame. Arm 130 is of such length that as it nears the end of its travel, extension 131 slips past underneath it, allowing arm 120 to continue on to the rest position, and also allowing arm 128 to be returned to position of Fig. 9. In order to insure that arm 128 drops downwardly, spring 133 is attached to the frame of the table and to arm 128. Spring 133 pulls arm 128 down, and brings arm 130 to bear against the upper side of extension 131 which yields and moves downwardly as shown in Fig. 9. Spring 132 returns the extension to its operative position when arm 130 is disengaged. The resilient mounting of extension 131 is provided to permit its limited movement as described. As arm 128 drops, stop 125 returns under the influence of gravity to bring its upper end into contact with the pallets and so engage the notch in the next succeeding pallet and stop it in the position shown in Fig. 9.

It will be noted that the means for regulating the feed of pallets includes elements 127, 128 and 130, mounted on table T, which operatively interconnect arm 120 and stop 125 both of which are mounted upon the machine frame F and so remain fixed in location relative to each other. By mounting the interconnecting linkage on table T, the pallet feed regulating means is operative only when the table has been moved to a stripping position; and in the case of Figs. 9 and 10, to the left-hand stripping position. Thus when the table is out of the stripping position, arms 120 may be moved by operation of the stripping means without causing the pallet feed regulating means to be operated. The significance of this feature will be pointed out hereinafter.

In order to keep the cables of tension members 68 and 69 always in grooves 81 and 82 respectively of bull wheel 80, roller 136 rides against the periphery of the bull wheel. Roller 136 is mounted on angle lever 137 and is yieldingly held against the bull wheel by the force of spring 138. Roller 136 also holds couplings 85 and 85a in proper position to be engaged by notch 84 and then presses the couplings into the notch as the bull wheel turns.

It will be obvious from the foregoing description that the ram, the reciprocating table, and the block-stripping means, as well as certain other mechanisms, operate in synchronism with each other. Although other means of achieving this same result may be used, I prefer to drive all of these mechanisms from common drive shaft 29 which serves as a common power source and causes the mechanisms driven thereby to be operated in a fixed timed relationship to each other that is easily determined and controlled. This relationship can be altered by changing the angular position of crank 27, eccentric 47, cam 90, or bull wheel 80 with respect to each other by relatively rotating one or more of these elements around the axis of drive shaft 29.

*Operation*

Having now described a preferred construction of my invention, I shall now describe briefly its operation. Consider first the operating cycle of the ram in filling the molds. This cycle may be considered to start with the ram in the extreme downward position, which is the position shown in Figs. 1 and 3. During the first 90° of rotation of shaft 29, the entire ram R moves upwardly, the ram body 33 reaching a position approximately as shown in Fig. 6. During this quarter-revolution, spring 28 has been contracting and drawing chain 26 after it. The sprocket wheels on the ends of the two shafts 24 are idling since in this direction of rotation ratchets 30 are being turned backwards and do not drive shafts 24.

During the next 90° of rotation, ram R continues upwardly to its extreme top position, while arm 27 moves downwardly pulling chain 26 in a direction to rotate both of shafts 24. Shafts 24 rotate in opposite directions so as to feed plastic mix out of the bottom openings 21 in the side walls of hoppers 20 into the path of ram 33. This feeding action of paddles 23 continues for approximately a half-revolution of shaft 29, during the last 90° of which ram R has moved on its downward stroke. Before paddles 23 stop rotating, they have fed into the path of ram 33 a quantity of concrete or other mix adequate to fill the mold beneath the ram; and the paddles are still during the final quarter-revolution of shaft 29 which brings the ram to the end of its downward stroke and again to the position of Figs. 1 and 3, after which the cycle just described is repeated.

During the entire cycle of ram operation just described, the tamping plates 50 are reciprocating up and down since shaft 55 is driven continuously by motor 57 independently of the other parts of the machine. This results in an improved compacting action on the plastic mix as it is pressed into the mold. The ram without tampers 50 tends to compact the mix only at the top of the mass being pressed into the mold, since the compaction of the mix is greatest at the face of plate 34 and decreases at a relatively high rate inwardly of the plastic mass. Hence there is a tendency to form a crust or plug in the column of mix contained between the faces of guide 35, the thickness depending upon the relative dimensions of the column. Tampers 50 operate to break up this crust and to extend the depth of compaction so that the density of the material pressed into the mold is more uniform. It has also been found that the tampers cause the water in the mix to move to the surfaces of the block formed. As a consequence of these actions, the tampers traveling with ram 33 produce a faster and more uniform and thorough compaction of the mix in the molds, that results in a final block of greater density; and they also produce a smoother surface on the block that makes a more saleable article.

It is not necessary that paddles 23 and ram 33 operate with exactly the same relative times of starting and stopping as described; but it is desirable that the paddles start feeding mix into the path of the ram as soon as it has cleared openings 21 on its upward stroke so that the ram will have a full charge ahead of it on its downward stroke. Also the paddles should stop feeding mix before ram body 33 substantially closes discharge openings 21. Within these limits, the relative periods of operation may be varied.

The exact amount of travel of the ram and the duration of its motion may differ from one stroke to another to a small extent because of the elastic connection between the drive and the ram afforded by springs 48. These springs not only serve as a shock absorbing feature to cause the ram to run more smoothly but also serve to equalize the final pressure applied by the ram upon the mix which it packs into the mold. If paddles 23 feed a slightly greater quantity of mix at one time than at another, the face of ram 33 cannot travel quite as far downwardly toward the mold, since there is a limit to the compressability of the mix. Springs 48 allow the amount of travel of the ram to vary within small limits from one stroke to another and prevent the drive connection between the main power shaft and the ram from being overstressed, thus eliminating breakage of parts.

The cycle of movement of table T will next be considered. If we consider the cycle as commencing at the same point as before with the parts in the position of Fig. 3, it will be seen that coupling 85 on the end of cables 68 is engaged now by notch 84 and bull wheel 80 so that table T, which has heretofore been stationary, is now at the start of its traversing movement which moves mold 64 out from under ram 33 and moves empty mold 63 into this position vacated by mold 64. Since bar 85 is ejected from notch 84 by ejector cam 86, the traversing movement of table T occurs for approximately 180° of revolution of drive shaft 29. It will be noted, from the explanation above, that this coincides rather closely with the period of upward movement of ram R. It will readily be appreciated that the traversing movement of table T should not commence before ram R starts to move upwardly, but that it may start at or shortly after that time. The length of time for the table movement is approximately that required for a half-revolution of shaft 29; but it may be found under some circumstances desirable to complete the table movement in less time than this.

Since table T moves for approximately one-half revolution of shaft 29, it follows that the table is stationary with a mold underneath ram R for the other half-revolution, more or less, of shaft 29. This period of rest coincides with the period during which ram R moves downwardly to compact a charge of plastic mix into mold 63. It will be apparent that the duration of the rest period of the table should be approximately as long as the period of downward travel of ram R, and may be somewhat longer if desired.

A complete cycle of upward and downward reciprocation of the ram takes place for each revolution of drive shaft 29; but on the other hand, during a single revolution of the drive shaft table T moves from one side of the machine to the other and then rests until ready to return, so that a complete cycle of movement of the table requires two revolutions of shaft 29.

Figures 13, 14, 15, 16, 17:
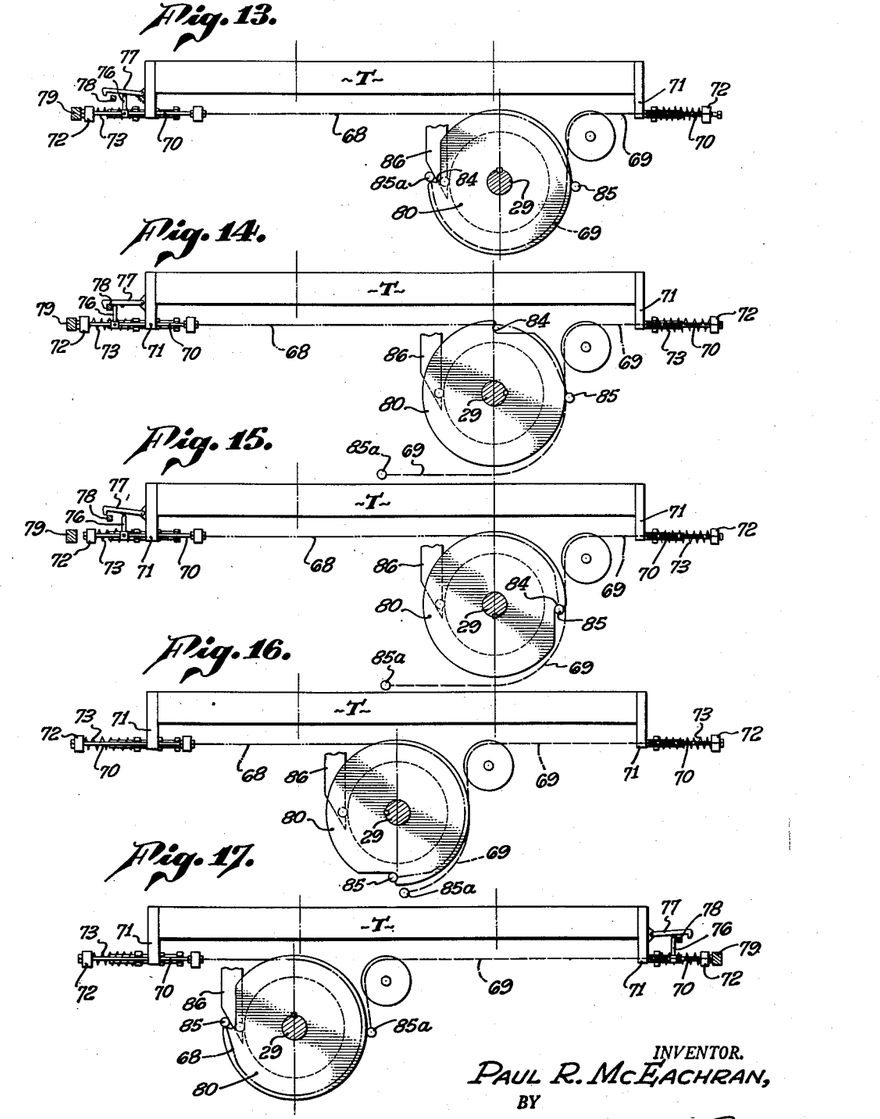
Figs. 13 to 17 are diagrammatic views showing successive positions of the bull wheel and cables for reciprocating the mold table, illustrating one-half a complete cycle.

A typical half cycle of operation of table T and bull wheel 80 can be explained by Figs. 13 to 17 inclusive, which show successive positions at intervals of 90° of rotation of shaft 29. A period of rest of the table starts with the position of Fig. 13 and continues through the position of Fig. 14 until movement commences with Fig. 15 in which the positions of the parts correspond closely to the showing of Fig. 3. The positions after 90° and 180° additional rotation of wheel 80 are shown in Figs. 16 and 17 respectively, the final position being that of the end of the right-hand traverse. The other half of the cycle during the next succeeding revolution of wheel 80 and shaft 29 is similar but reversed as to direction of movement and the tension member concerned, and can be understood from the following without specific detailed description.

In Fig. 13, coupling 85a on cables 69 is being ejected from engagement with bull wheel 80 at the end of the leftward traverse of table T. As the coupling is ejected, the coupling and cable fall down and come to rest in pan 89, as shown in Figs. 6 and 14. During the next half-revolution of bull wheel 80, no movement of the table takes place. Thus the bull wheel moves from the position of Fig. 13 through the position of Fig. 14 to that of Fig. 15 at which it engages coupling 85 of cable 68 in notch 84. Neglecting for the time being the action of the table release mechanism, and assuming the table to be free to move, the continued rotation of bull wheel 80 places cables 68 in tension thus traversing table T toward the right through the successive positions shown in Figs. 16 and 17. At Fig. 17 bar 85 is being ejected by ejector 86 and it then falls down and comes to rest in pan 89 occupying the same position as that shown in Fig. 6 for cable 69. The rightward movement of the table has taken cable 69 with it of course, so that coupling 85a has been returned to a position that is approximately at the level of the axis of shaft 29 where it can be again engaged by notch 84 after bull wheel 80 has rotated 180° from the position of Fig. 17. After this latter engagement, rotation of the bull wheel pulls table T toward the left returning it to the position of Fig. 13. This leftward movement of the table retracts cable 68 and removes coupling 85 from pan 89, drawing the coupling up to the point shown in Fig. 13 at which it can be engaged by notch 84.

Couplings 85 and 85a are pressed into notch 84, and the cables of members 68 and 69 are maintained in grooves 81 and 82 respectively of bull wheel 80 by the pressure applied on the cables by the agency of roller 136.

When the table is moved in either direction, it initially over-travels a small amount, as shown in Figs. 13 and 17. Considering Fig. 13, as being typical, the pull of tension member 69 carries the table to its extreme leftward range of movement, bringing bar 72 into engagement with bumper 79 and compressing springs 73 which bring the table to rest. Latch 77 passes over and beyond stop 78 so that the latch can fall down by gravity with its hooked end over the stop. The expansion of springs 73 moves the table slightly in the reverse direction, that is toward the right, but the travel is limited because latch 77 engages stop 78 and prevents further travel of table T toward the right.

The parts are now in the position of Fig. 14, with the table locked against movement to the right and mold 64 in registration with the guide 35 through which the ram forces a quantity of mix into the mold. Mold 63 is in exact registration with its associated stripping means S so that the block B previously formed in the mold can now be stripped therefrom.

The pull of tension member 68 upon table T initially produces no movement at all of the table, but merely produces movement of bar 72 and compresses spring 73. The movement of rod 70 causes finger 76 to move relative to the table and to latch 77 for a short distance until finger 76 engages a projection on the underside of latch 77 and thereby raises the latch out of engagement with stop 78. Figure 15 illustrates this position of the parts in which bar 72 has been retracted from bumper 79 and finger 76 has lifted latch 77. Table T is now free to move to the right under the force exerted on it by cable 68.

The operating cycle of the stripping means will now be described with the aid of Figs. 3, 6 and 8. Considering the cycle to start with the parts in the position of Fig. 3, since this position has been used as a starting point for other cycles of operation, we find that the stripping means S, comprising pins 100, are lowered at both ends of the machine. For approximately the next 180° of revolution of shaft 29 and cam 90, follower 91 is in engagement with section 90a of the cam which is a circular arc; and during movement of the follower over this portion of the cam, there is no motion imparted to arms 93 and 95.

As soon as follower 91 reaches cam surface 90b, which has a radial component, follower 91 is moved outwardly away from the axis of shaft 29, its true path of movement being along an arc with its center at the axis of pivot 94. The downward movement of the follower depresses the inner ends of both arms 93 and 95 and raises the outer ends carrying stripping pins 100. This upward movement of stripping pins 100 is continued as follower 91 rolls over cam surface 90c; but since surface 90c has a smaller radial component, so that the rate of rise of pins 100 is less, there is a corresponding increase in the force which they are enabled to apply. The cam segment 90b is designed to be of such length as to quickly raise the stripping pins to, but just short of, engagement with the underside of pallet 65 in mold 63.

Segment 90c is designed to provide a greater mechanical advantage during the next portion of the movement of operating lever 93 since the removal of the block B from the mold requires application of greater force. The transition from segment 90b to 90c is preferably a slight spiral, but may be a circular arc, with reference to the center of shaft 29, in order to reduce the rapid approach of stripping pins 100 to pallet 65 to a momentarily slow motion at the instant of contact of pins 100 and pallet 65, thus greatly reducing, if not eliminating, shock upon impact of the pins on the underside of the pallet. After full contact, the pins are advanced at a more rapid rate yet slowly enough to apply a relatively large force to the pallet to accomplish the initial step in removing the block from the mold. The slope of segment 90c, that is its departure from a curve of uniform radius about the center of shaft 29, determines the speed of pins 100 and the mechanical advantage of the force applied thereto. This is, of course, true of all the segments of the cam. Once loosened from the mold, the block and pallet are quickly and easily lifted clear of the mold. In order that the instant of contact with the pallet can be timed exactly, pins 100 are preferably each made in two pieces threaded at their ends into plate 99. This permits individual adjustment of the length of the pins. Lock-nuts are provided at the threaded ends of the pins bearing against plate 99 to hold the pins in adjusted positions. This arrangement also permits subsequent adjustments to be made to compensate for wear on the pins.

Cam segment 90c is of sufficient length to cause pins 100 to lift the block entirely clear of the mold and a short distance above it, into the position shown in Fig. 8. At this point block B has passed into the confines of curing frame 105, but is still supported upon pins 100. This represents the extreme upward range of movement of the stripping means and block B; and at this point in their travel, follower 91 is on the hump 90d. At this point upward movement of the stripping means ceases and downward movement for a short distance takes place as the cam travels off hump 90d and onto circular segment 90e.

Cam segment 90e is a circular arc so that there is no movement of the stripping pins while follower 91 is on this segment. The length of the segment is approximately one-sixth of a revolution of shaft 29, but may be more or less as desired. During this time the stripping pins are held in the position shown in Fig. 6 in which the tops of the pins are just slightly below the top edge of mold 63 and table T. In this position they are able to receive a replacement pallet as it is advanced from the end of the row of pallets entering the machine.

At the end of cam segment 90e is a small hump 90f which causes pins 100 to rise momentarily for a short distance. The purpose of this upward movement is to cause the pins to pick up the replacement pallet which has been moved into position over mold 63, and cause the pins to be seated in the positioning indentations in the bottom side of the pallet with the result that when the pins are subsequently lowered the pallet is properly positioned with respect to the side walls of mold 63. With this arrangement, the stripping means serves to lower the replacement pallet into the mold rather than merely having the pallet drop into the mold as it is pushed over the edge thereof.

Cam section 90g has a radial component which allows follower 91 to rise, that is to move closer to the axis of shaft 29, thus dropping the outer end of arm 93 and the associated stripping pins 100. It is this downward movement of the stripping pins which seats the new pallet in the mold, preparing the mold for re-use, and retracts the pins entirely from table T so that the table is free to move again to the right. The cam segment 90g connects with circular arc 90a so that the parts are returned to the same relative positions occupied in Fig. 3.

Although in the above description, only the stripping means at one end of the machine has been specifically referred to, it will be understood that the stripping means at the other end of the machine goes through substantially the same cycle of operation, and this is true even though there may be no mold positioned above the stripping means, which is the case of Fig. 3. The movement of the two stripping means varies in minute details because they are operated simultaneously from a common follower 91 which actuates both arms 93 and 95; and consequently the movement of follower 91 is not identical with respect to both pivots 94 and 96. However, these small differences in movement do not alter the principle of operation as described above.

As mentioned above, arms 120 are actuated by upward movement of the stripping means to effect inward movement of spring fingers 118 on the curing frame just before the stripping pins reaches the end of their upward motion and after the block has been raised to a level higher than the spring fingers. By means of the latch mechanism, including plates 121, mounted on the lower ends of arms 120, fingers 118 are held in this inward position until after downward movement of the stripping means deposits the pallet and block on the fingers. Continued downward movement of the stripping means releases latch plates 121 and allows arms 120 to move outwardly. This motion of arms 120 and fingers 118 takes place while follower 91 is riding over hump 90d of main cam 90.

This outward movement of arms 120 brings extension 131 into engagement with arm 130 and thereby releases stop 125 from shoulder 65b and the notch in the underside of the leading pallet in the row entering the machine. This action and the associated movements of the several parts have been described above in connection with Figs. 9 and 10. This operation of the pallet feed control allows the row of incoming pallets to advance the forward pallet into a position over empty mold 63, the advancement of the row being halted by stop 125 engaging the notch in the underside of the next pallet as it moves into the lead position.

Figure 18:
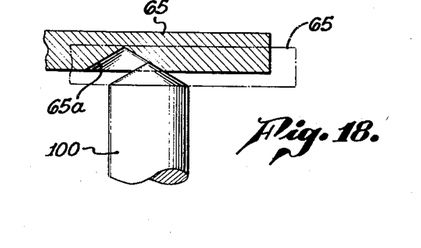
Fig. 18 is a fragmentary vertical section of a pallet showing the motion induced by the stripping pins.

The pallet just advanced over mold 65 is supported in that position partly by the edge of the mold but chiefly upon the upper ends of pins 100, as the tops of these pins are slightly below the top edge of the mold, and are now held in this position as follower 91 rides over cam segment 90e. Ordinarily, the ends of pins 100 are only partly within indentations 65a in the pallets at this initial position, as shown by the full lines in Fig. 18. As the follower rides over the small hump 90f, pins 100 are momentarily raised, lifting the pallet clear of the mold and finally positioning the pallet by causing the conical upper ends of pins 100 to be fully seated in the conical indentations 65a in the underside of the pallet. When the pins lift the pallet clear of the mold, the pallet slides forward and down, because of the interaction of the sloping surfaces on pins 100 and pallets 65, bringing the pallet to the dotted line position of Fig. 18. As follower 91 moves over cam segment 90g, the stripping pins are lowered and deposit the pallet on the bottom of mold 63, which is now ready to be refilled.

It requires two complete revolutions of shaft 29 to effect a complete round trip of table T; whereas the stripping means are each reciprocated up and down in a complete cycle for each revolution of shaft 29. As a result, on alternate cycles of movement of the stripping means, there is no mold above the pins to be stripped. This condition is shown in the right-hand end of Fig. 3. During this cycle of the stripping means, the pallet feed control means is not operated since it is disconnected from arms 120 and extension 131 by the removal of bar 128 and its associated parts which are attached to and travel with table T. This latter mechanism operatively connects stop 125 with an operating arm 120 only when the table has been returned to a position at the end of its travel at which it is desired to feed a pallet.

The registration pins 109 are lifted clear of holes 108 in the curing frame at every movement of the table bringing an empty mold into position to be filled. Thus as the table T moves toward the right from the position occupied in Fig. 6, angle lever 116 is rotated counterclockwise by engagement with shaft 129 to raise the registration pins clear of the frame, as shown in Fig. 11. The same operation of the registration pins takes place at the right-hand side of the machine as the reverse travel of table T takes place. The pins are raised clear of the frame only momentarily and are dropped back into place to ride along the top of the frame and be pressed into the next set of registration holes.

Having described a preferred form of my invention, it will be evident that changes in the detailed construction and arrangement of parts may be made by persons skilled in the art without departing from the spirit and scope of my invention; and consequently I wish it understood that the foregoing disclosure is considered as being illustrative of, rather than limitative upon, the appended claims.

I claim:

1. In a block-forming machine of the character described having a mold to receive a charge of plastic mix, the combination comprising: a ram for compacting the charge in the mold; means for reciprocating the ram toward and away from the mold; and tamping means mounted on the ram to travel therewith, said tamping means penetrating the body of mix in the mold ahead of the ram.

2. In mechanism for compacting mix in a mold, the combination comprising: a ram movable toward and away from a mold to compact plastic mix in the mold; means for so moving the ram; and tamping means carried on the ram, including relatively movable tamping members operating within a short range immediately beyond the working face of the ram.

3. Mechanism as in claim 2 that also includes motor means carried by the ram; a crankshaft mounted on the ram and rotated by the motor; and drive means operatively connecting the crankshaft to the individual tamping members to reciprocate the members relative to the ram.

4. Mechanism as in claim 2 in which the tamping members each have a working face with an area equal to but a small fraction of the area of the working face of the ram.

5. Mechanism as in claim 2 in which the tamping members are each a plate-like member that extends substantially across the working face of the ram and is spaced from the other tamping members.

6. In a block forming machine of the character described having a mold to receive a charge of plastic mix, the combination comprising: a ram for compacting the charge in the mold; means for reciprocating the ram toward and away from the mold; tamping means mounted on the ram to travel therewith, said tamping means including a plurality of separately movable tamping members mounted to project below the working face of the ram and penetrate the body of mix in the mold ahead of the ram; and means for reciprocating the tamping members independently of and relative to the ram body.

PAUL R. McEACHRAN.

References Cited in the file of this patent

UNITED STATES PATENTS

| Number | Name | Date |
|---|---|---|
| 70,585 | Long | Nov. 5, 1867 |
| 208,566 | Caldwell | Oct. 1, 1878 |
| 784,154 | Gutteridge et al. | Mar. 7, 1905 |
| 868,730 | Tubesing | Oct. 22, 1907 |
| 943,797 | Short | Dec. 21, 1909 |
| 1,508,212 | Bliss | Sept. 9, 1924 |
| 1,521,292 | Harrison | Dec. 30, 1924 |
| 1,528,582 | Straub | Mar. 3, 1925 |
| 1,577,383 | Straub | Mar. 16, 1926 |
| 1,590,542 | Parkhurst | June 29, 1926 |
| 1,591,904 | Wightman et al. | July 6, 1926 |
| 1,669,682 | Straub | May 15, 1928 |
| 1,695,327 | Goldston | Dec. 18, 1928 |
| 1,796,636 | Toulmin, Jr. | Mar. 17, 1931 |
| 1,925,050 | Jagdmann et al. | Aug. 29, 1933 |
| 1,993,760 | Sutter | Mar. 12, 1935 |
| 2,148,084 | Nock | Feb. 21, 1939 |
| 2,160,462 | Schieferstein | May 30, 1939 |
| 2,193,879 | Muenzer | Mar. 19, 1940 |
| 2,270,829 | Wellnitz | Jan. 20, 1942 |
| 2,282,891 | Schwalbe | May 12, 1942 |
| 2,431,034 | Gelbman | Nov. 18, 1947 |
| 2,463,965 | Grassi et al. | Mar. 8, 1949 |
| 2,467,203 | Gelbman | Apr. 12, 1949 |
| 2,478,676 | Temple, Sr. | Aug. 9, 1949 |
| 2,496,000 | Bugenhagen | Jan. 31, 1950 |